United States Patent [19]

Uebelhart et al.

[11] 3,926,048

[45] Dec. 16, 1975

[54] DEVICE FOR THE DIGITAL INDICATION OF THE ACCURACY OF A MECHANICAL CLOCKWORK

[75] Inventors: Heinrich Uebelhart; Erich Schmid; Paul Wyser, all of Itingen, Switzerland

[73] Assignee: Renata A.G., Itingen, Switzerland

[22] Filed: Dec. 12, 1972

[21] Appl. No.: 314,464

[52] U.S. Cl. .................................................. 73/6
[51] Int. Cl. ........................................... G04d 7/12
[58] Field of Search ................ 73/6; 324/186, 188

[56] References Cited
UNITED STATES PATENTS

| | | | |
|---|---|---|---|
| 2,532,631 | 12/1950 | Loria | 73/6 |
| 3,238,764 | 3/1966 | Greiner | 73/6 |
| 3,370,456 | 2/1968 | Jocker | 73/6 |
| 3,624,649 | 11/1971 | Renieri | 235/92 EV |
| 3,777,547 | 12/1973 | Izumi et al. | 73/6 |
| 3,868,845 | 3/1975 | Shimizu | 73/6 |

FOREIGN PATENTS OR APPLICATIONS

| | | | |
|---|---|---|---|
| 496,666 | 12/1938 | United Kingdom | 73/6 |

Primary Examiner—S. Clement Swisher
Attorney, Agent, or Firm—Darby & Darby

[57] ABSTRACT

The invention concerns a system for the digital indication of the accuracy of a mechanical clockwork, with a microphone for transforming the periodic noises formed in the clockwork into electrical signals, an amplifier for amplifying these signals, a timing pulse generator, a movement counter and an indicator for indicating the accuracy of the movement and a counter and indicator for indicating the accuracy of the drop setting.

2 Claims, 9 Drawing Figures

DEVICE FOR THE DIGITAL INDICATION OF THE ACCURACY OF A MECHANICAL CLOCKWORK

Systems for determining the accuracy of clockworks are already known which have a microphone for transforming the noises caused by the balance of the clockwork into electrical signals, which in turn are recorded on a paper tape. From these recordings can then be drawn conclusions of the accuracy of the tested clockwork. The evaluation of these recordings is not simple and requires considerable time.

The object of the present invention is to provide a system which does not have the above mentioned disadvantages, which permits an exact measurement of the accuracy of the clockwork, and which indicates the result in digital form, and which beyond that also permits a digital indication of the poise of the balance.

The system according to the invention includes an amplifier which has in the signal path a full wave rectifier for transforming the signals generated by the microphone into a pulse trains and a limiter stage. A pulse selector connected to the output of the amplifier is provided for generating a first measuring pulse at the start of measuring interval and a second measuring pulse at the end of the measuring interval which extends over several oscillations of the balance of the clockwork. A forward and backward counter is provided for determining the poise of the balance of the clockworks. A counter starting device is provided for putting the movement counter and the forward-and-backward counter into the starting position before each measuring interval and for releasing the forward-and-backward counter during an oscillation of the balance of the clockwork. An indicator control device is also provided for starting and stopping the indicator display.

The subject of the invention will be described below more fully by way of example on the basis of the drawings.

Figure 1:
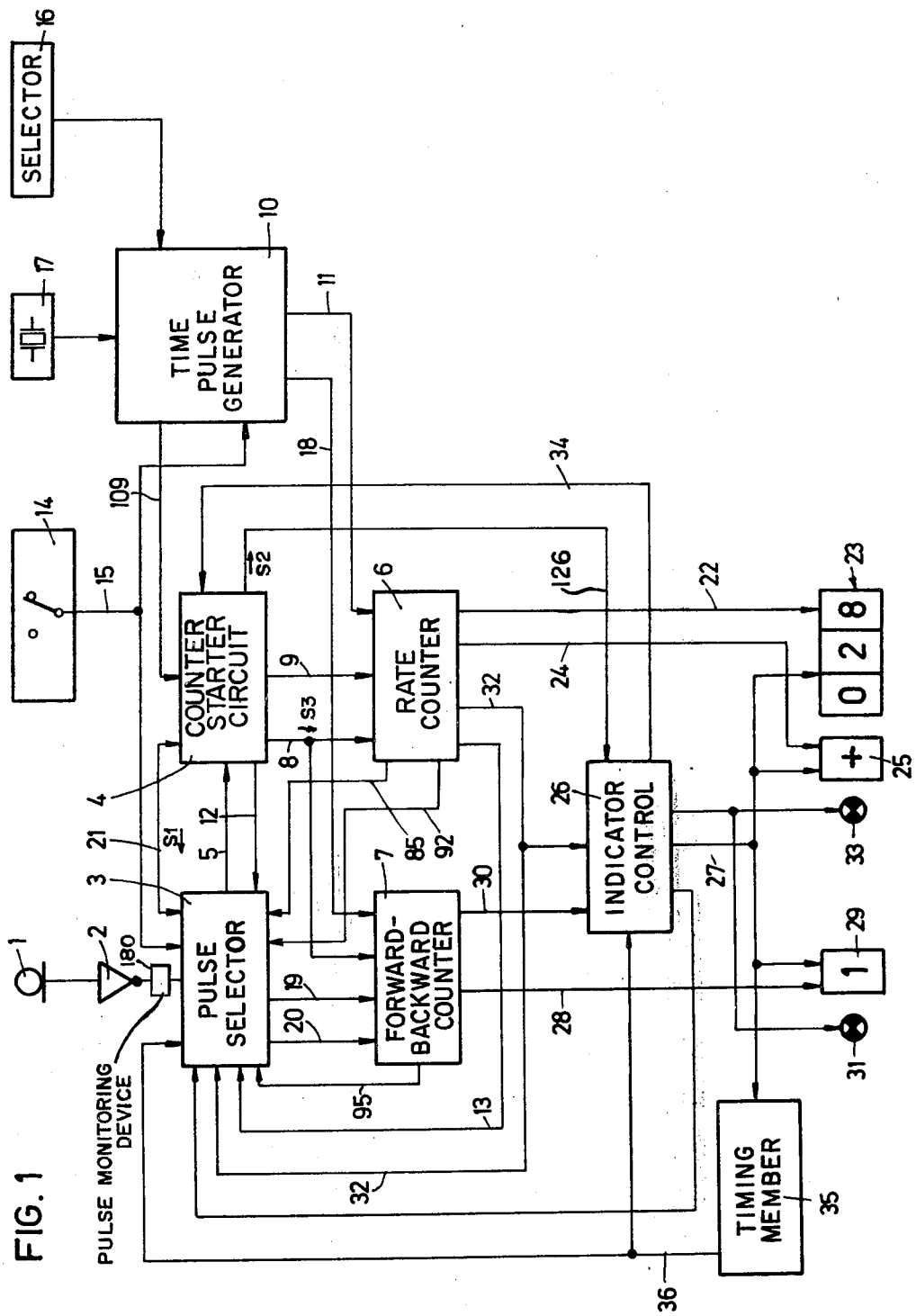
FIG. 1 is a block diagram of the system for the digital indication of the accuracy and to verify the poise of the balance of a clockwork with a balance.

FIG. 1 is a block diagram of a system for providing a digital indication of the accuracy of the balance movement and to verify the poise of the balance of a mechanical clockwork. This system comprises a microphone 1 which is placed adjacent to a watch or clockwork (not shown) to receive the noises of its pallets, or sounds, as the escapement operates. These sounds are transformed in microphone 1 into electrical signals which are amplified in amplifier 2 and fed in the form of successive trains of pulses to a pulse selector 3. The function of pulse selector 3 is to transform the pulse trains received from amplifier 2 into measuring pulses of a defined duration, each preferably about one fifth of the period of an oscillation of the balance wheel of the clockwork, and to select from these measuring pulses on which indicates the start of a measuring interval.

The measuring pulses are fed from selector 3 to a counter starter circuit 4 over a conductor 5. Circuit 4 generates control signals s1, s2, s3 and s4 in a manner described more fully below with respect to FIG. 4, which signals substantially control the individual circuits of the system during each measuring interval. The durations of the control signals are very short, compared to the duration of the measuring pulses, so that the switching times from one function of the system to the other are very short and there are no measuring errors.

The system also has a movement counter 6 to determine the accuracy of the clockwork movement and a forward-and-backward counter 7 to verify the poise of the balance. The first measuring pulse supplied by the pulse selector 3 to the counter starter circuit 4 during a measuring interval causes a control signal s3 to be fed to the two counters 6 and 7 over a line 8, which signal sets the movement counter 6 to a certain count, for example 86,400, and sets the forward-and-backward counter 7 to zero. The first measuring pulse also causes circuit 4 to produce the control signal s4 which is a gate signal that is fed to the movement counter 6 over a line 9. Upon receipt of the gate signal s4, the movement counter 6 starts and begins to count backward timing pulses fed to it over a line 11 from a timing pulse generator or clock, 10.

The first measuring pulse supplied by the pulse selector 3 to the counter starter circuit 4 is returned over a line 12 to the pulse selector 3 as confirmation of the reception. The pulse selector 3 is blocked by the returned first measuring pulse, so that no further measuring pulses arrive from selector 3 at the counter starter 4 even though the pulse selector 3 receives additional pulse trains from the amplifier 2.

Figure 2:
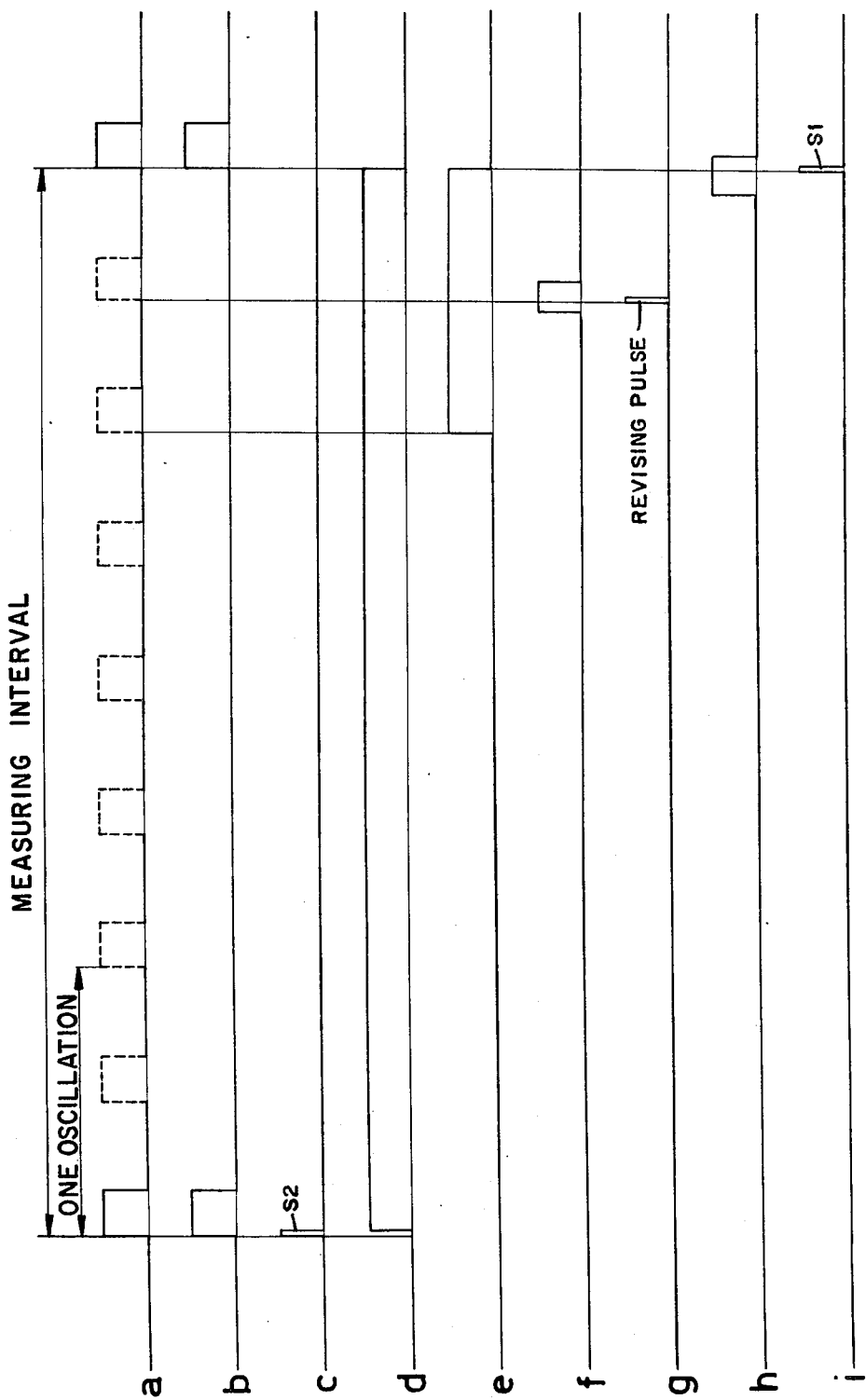
FIG. 2 shows graphic representations of various pulses and signals to illustrate the operation of the system according to FIG. 1.

Pictorial representations of certain signals and pulses are shown in FIG. 2 plotted as a function of time. Line a shows on the extreme left the first measuring pulse produced by the pulse selector 3. The following seven pulses, shown in broken lines, would appear at the output of the pulse selector 3, that is, on line 5, if they were not blocked by the first measuring pulse returned from circuit 4 on line 12 as a confirmation pulse. This blocking of pulse selector 3 is lifted shortly before the eighth pulse train appears at selector 3, which is transformed into the second measuring pulse represented in solid lines at the end of line a. The release signal for unblocking pulse selector 3, which is shown on line h of FIG. 2, is fed to the pulse selector 3 over a conductor 13 from the movement counter 6 when the latter has counted down to a minimum count, for example, of 500. When the next (eight) pulse train from amplifier 2 then appears at the input of the pulse selector 3, a second measuring pulse is produced by selector 3 and is supplied over line 5 to the counter starter circuit 4. This has the effect that the gate signal which is shown on line d of FIG. 2 fed to the movement counter is stopped by the control signal s4 and the reading of the movement counter 6 is a measure of the accuracy of the clockwork.

As it can be seen from line *a* in FIG. 2, two pulses corresponding to two pulse trains produced by microphone 1, are fed to the pulse selector 3 for each oscillation of the clockwork balance. The entire measuring interval extends over four oscillations of the balance or escapement, the measuring interval ending at the start of the fifth oscillation. If a clockwork is tested, for example, which should perform 9000 balance oscillation per hour, that is, 18,000 strikes, if it runs very accurately, the duration of the measuring interval extending over four oscillations is 4 × 0.4 sec. = 1.6 sec. If timing pulses at a rate of 54,000 pulses per second are fed during the measuring interval over line 11 to the movement counter, 6, which has been set at the start of the measuring interval to 86,400, the reading at the end of the measuring interval of 1.6 seconds will be zero. Any deviations of the counter from zero indicate the deviation of the clockwork in seconds per day, because a whole day is simulated with the selection of the length of the measuring interval, the counter reading and the pulse frequency, there being 86,400 seconds in a day.

With the system represented in FIG. 1, the duration of the measuring interval can be selected by means of a switch 14 to either correspond to the duration of 4 oscillations or 16 oscillations of the balance. Signals are supplied over line 15 to the timing pulse generator 10, to reduce the rate of the timing pulses fed to the movement counter 6 over line 11 to one fourth when a selector switch 14 is set for a 16 oscillation measurement, so that the reading of the movement counter 6 after the measuring interval extending over 16 oscillations of the clock movement corresponds again to the deviation in seconds per day. Signals are also supplied by the selector switch 14 to the pulse selector 3 which serve to switch for verifying the poise of the balance, as described below, when 16 oscillations are measured.

In order to be able to measure clockworks which are designed for balance oscillation frequencies than 9,000 per hour, a selector switch 16 is provided for controlling a frequency divider (not shown) in the timing pulse generator 10. It is important that the frequency of the timing pulses be very accurate and stable. The pulse generator 10 therefore receives a base frequency from crystal-controlled high frequency generator 17, whose normal frequency is divided by the frequency divider of pulse generator 10 into the required timing pulse frequency.

For measuring the poise of the balance, that is, the unsymmetry of the balance oscillations, timing pulses from the timing pulse generator 10 are also fed over line 18 to the forward-and-backward counter 7, which has been set back to zero at the beginning of the measuring interval. The timing pulses are only counted when the forward-and-backward counter 7 has received a release, or gate, signal over line 19 from the pulse selector 3. This is represented in line *e* of FIG. 2. The release signal appears only at the start of the last oscillation within the measuring interval. From this time on, the forward-and-backward counter 7 counts the timing pulses fed to it over line 18 in a forward direction. When the pulse train appears at the input of the pulse selector 3 at the start of the fifth oscillation, that is, when the second measuring pulse appears, the counting direction of the forward-and-backward counter 7 is stopped simultaneously with the movement counter 6 since the two release signals on lines 9 and 19 are cut off by the appearance of the control signal s1. This signal is fed to the pulse selector 3 over a line 21 and is represented in line *i* of FIG. 2. The count remaining in the forward-and-backward counter 7 is a measure of the poise of the balance. The rate of the timing pulses fed to the forward-and-backward counter 7 is preferably so selected that the counter reading corresponds to the drop setting in ms.

The output of the movement counter 6 is connected over a multi-wire cable 22 to an indicator 23. Though the movement counter 6 preferably has at least five counting decades, only three decimal digit decade indicator panels are provided in the indicator 23 for the units, tens and hundreds. Because deviations of more than 400 sec/day represent a very poor value, a digital indication of such a great deviation is not utilized. In this case it suffices to indicate only whether the deviations are positive or negative. A corresponding signal is fed from the movement counter 6 over line 24 to a sign-indicating panel 25 of the indicator 23. The indicator panels of displays 23, 25 light up only when they receive a corresponding signal from an indicator control device 26 over a line 27.

The output of the forward-and-backward counter 7 is connected over a multi-wire cable 27 to a single indicator display panel 29 for the indication of the poise of the balance. Since the deviation of the poise of the balance should be no more than 9 ms in a good clockwork, the digital indication of this deviation is not utilized if it is more than 9 ms. If the reading of the forward-and-backward counter 7 is greater than 9 ms at the end of the measuring interval, the indicator control circuit 26 receives an alarm signal over a line 30 which has the effect of lighting a pilot lamp 31 which indicates that the measured value is outside the normal tolerance.

An alarm signal, generated by the movement counter 6 when the permissible accuracy tolerance for the movement is exceeded, is supplied over a line 32 to the pulse selector 3 to start a new measuring interval. This alarm signal is also supplied to the indicator control device 26, and if this alarm signal appears consecutively for three measuring intervals, a second lamp 33 lights up, indicating that the deviation is more than 500 sec/day. At the same time a stop signal is generated in the indicator control device 26 and is supplied over a line 34 to the counter starter circuit 4 to prevent the generation of additional control signals s1 to s4. This means that the device is in rest position and only the lamp 33 and possibly the lamp 31 are lit.

A timing member 35 is connected to the line 27 on which a command signal generated in the indicator control device 26 appears when the reading of the movement counter 6 at the end of the measuring interval is less than 500, within the permissible limit of the system. The command signal is also applied to displays 23, 25 and 29. Member 35 contains a delay device and determines for how long after the command signal the result of the measurement is visible on the indicator displays. When the indicating time has elapsed, the time member 35 generates an end signal which is fed over a line 36 to the indicator control circuit 26 to cut off the indication and to the pulse selector 3 to start a new measuring interval.

Figure 3:
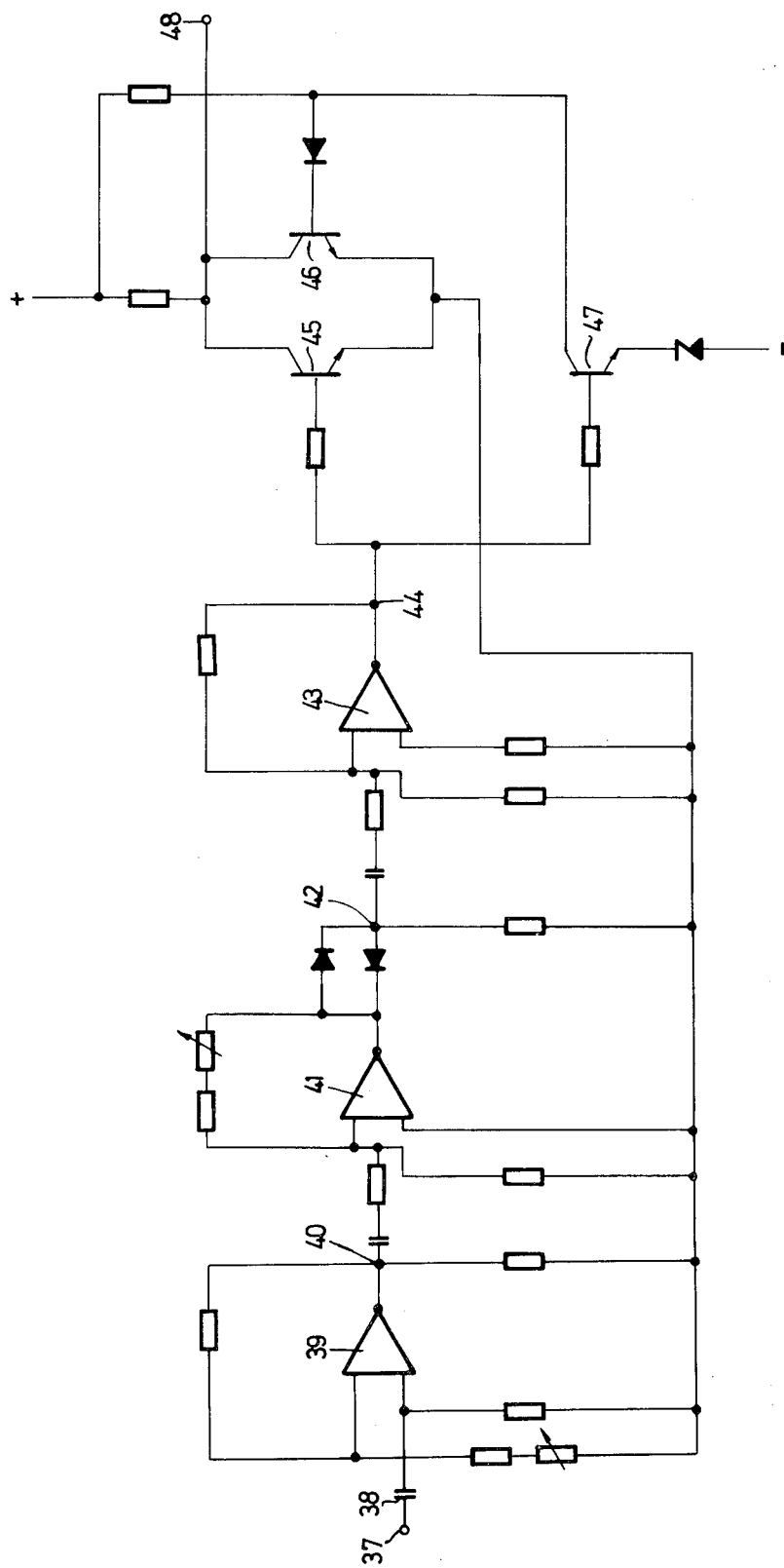
FIG. 3 is a detailed wiring diagram of the amplifier represented in FIG. 1 for amplifying the signals produced by a microphone.
Figure 4:
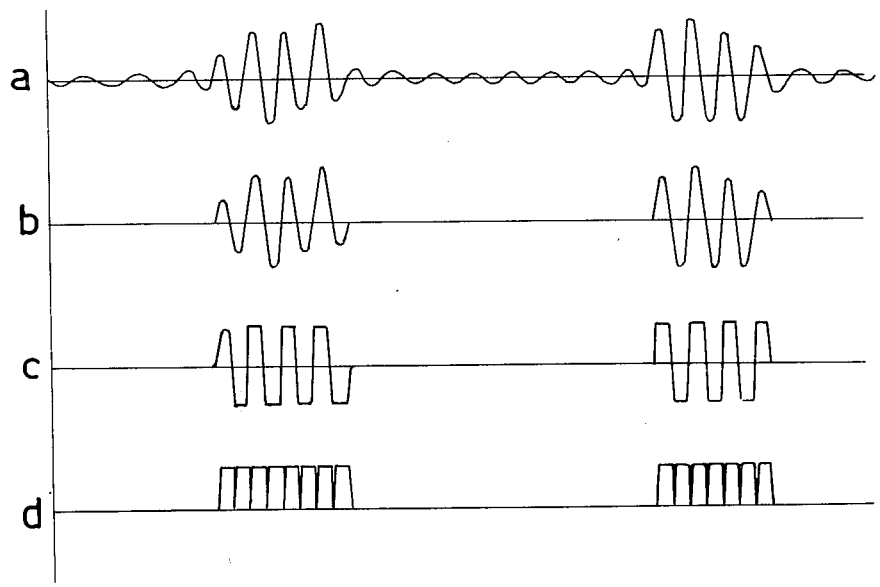
FIG. 4 shows graphic representations of the electrical signals at different points of the amplifier according to FIG. 3.

FIG. 3 shows the wiring diagram of the amplifier 2 of FIG. 1, and FIG. 4 shows graphic representations of signals at various points of this amplifier 2. Line a of FIG. 4 shows the electrical signals produced by the microphone 1 which correspond to the noises produced by the pallet levers striking against the teeth of the escapement wheel of the clockwork. These electrical signals differ from clockwork to clockwork and represent the in and out movements of mechanical parts, the pallet operating against the escapement wheel. The electric signals fed to the input terminal of the amplifier 2 also contain noise. The composite signals arrive over a capacitor 38 at the input of a pre-amplifier stage 39. The same signals of line a of FIG. 4 appear at the output 40 of the pre-amplifier stage but the voltage is much higher. The amplified signals are fed to a noise-suppression stage 41. At the output 42 of stage 41 appear only those electrical signals which are produced by the levers striking against the teeth of the escapement wheel. The noise is eliminated as seen in line b of FIG. 4. The signals, free of the noise portions, are amplified and limited in a limiter stage 43. The degree of amplification of this limiter stage is such that it is saturated by a small amplitude input signal so that all pulses assume the same amplitude. The signal appearing at the output 44 of the limiter stage 43 is represented in line c of FIG. 4. The limited signals are rectified by means of an active full wave push-pull type, rectifier circuit comprising three transistors 45, 46 and 47, so that a pulse train according to line d of FIG. 4 can be tapped off at the output terminal 48 of amplifier 2.

Because of the high amplification of the signals in the limiter stage 43 and the full wave rectification of the limited signals, a pulse of equal amplitude and the same polarity appears at the start of each pulse train, regardless of whether the first half wave of the electrical signal produced by the microphone in response to the mechanical movement is positive or negative. The first pulse of each pulse train can be used accordingly for precise control of the pulse selector 3 so that the measuring accuracy is substantially increased.

Figure 5:
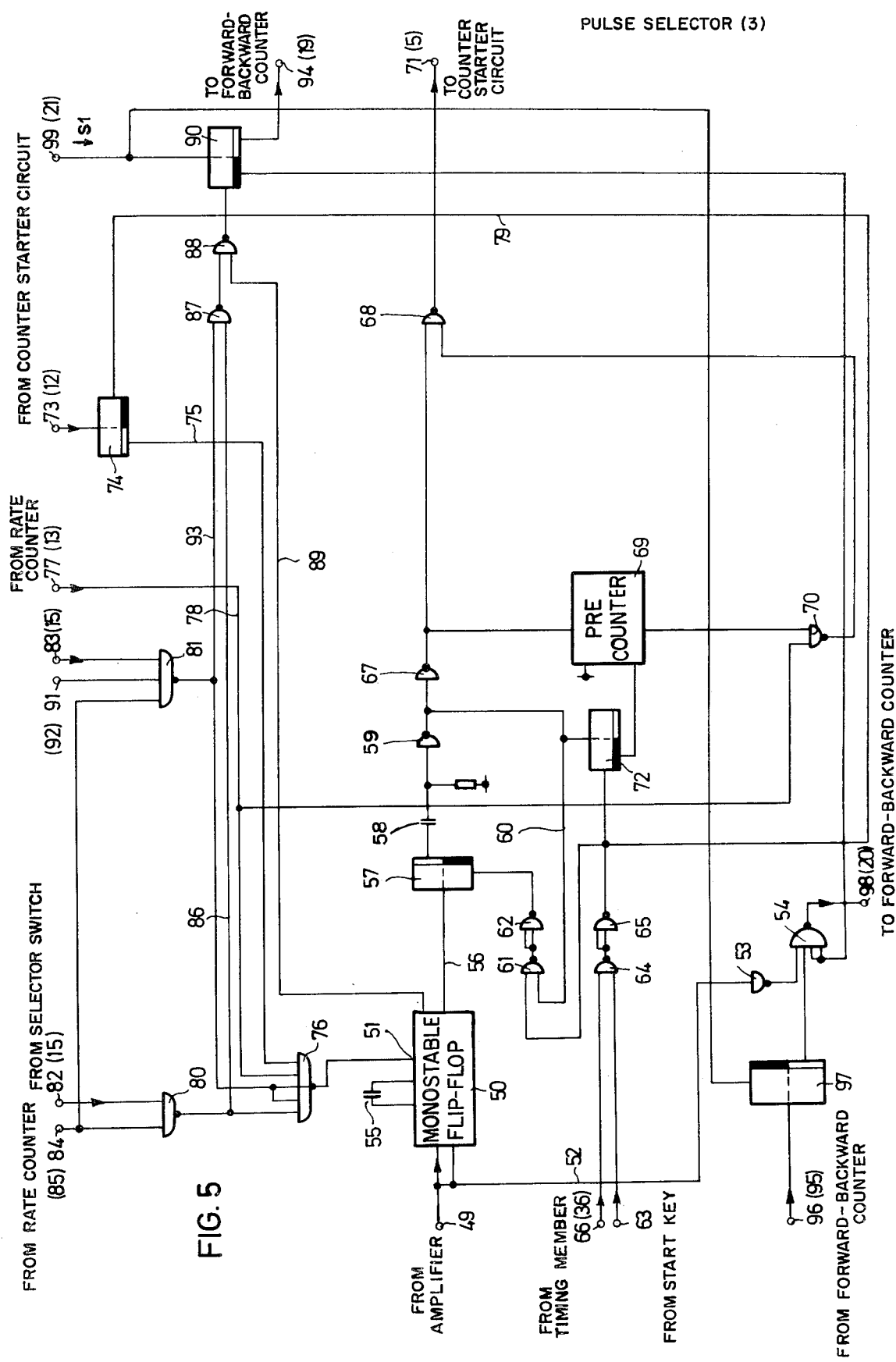
FIG. 5 is a detailed wiring diagram of the pulse selector according to FIG. 1.

FIG. 5 shows the pulse selector 3 in greater detail. The pulse trains produced by the amplifier 2 are fed to the input terminal 49 and arrive, on the one hand, at a monostable flip-flop 50, which has a blocking input 51 and, on the other hand, over a line 52 at an inverter 53 at the input of an AND gate 54. The pulse trains which arrive at the flip-flop 50 serve to measure the accuracy of the movement, and those pulse trains which arrive at the gate 54 serve to verify the poise of the balance.

At first no blocking signal is applied to the blocking input 51 of the flip-flop 50. If not blocked, flip-flop 50 flips into its second, or ON state when the beginning of the first pulse of each pulse train arrives, and returns by itself into its initial, or OFF, sate after a time dependent upon the value of a capacitor 55. The ON time of the flip-flop is selected so that it lasts slightly longer than the pulse train. The flip-flop resets before the next pulse train is received. The output pulses from flip-flop 50 appear on a line 56 which connects one of the two outputs of the flip-flop 50 with the input of a bistable flip-flop 57. These pulses, which are of equal time duration, correspond to the number of pulse trains. The start of each pulse on line 56 coincides with the first pulse of each pulse train.

A capacitor 58 is connected at the output of the flip-flop 57 so that, when this flip-flop 57 is set by a pulse on line 56, a short pulse is fed to an inverter 59. The output of the inverter 59 is connected back to the reset input of flip-flop 57 over a feedback loop, which consists of a line 60, the first input of a gate 61 and an inverter 62. The flip-flop 57 is reset to be set again by the next pulse generated by the monostable flip-flop 50, when the gate 61 is open in response to a start signal which is fed from a terminal 63 to an OR gate 64 by actuating a start key (not shown). Gale 64 is connected through an inverter 65 to the second input of the gate 61. The gate 61 is likewise open when the end signal generated by the timing member 35 (FIG. 1) is fed over line 36 and input terminal 66 to the gate 64.

The pulses produced at the output of the inverter 59 are fed to another inverter 67, which then transmits the pulses to the first input of a temporarily closed NAND-gate 68 and to the input of a pre-counter 69. This pre-counter after counting five pulses, produces a pulse which is fed to a NAND-gate 70. This pulse arrives at the NAND-gate 68 to open the latter, so that the first measuring pulse arrives at the output terminal 71 and from there over line 5 in the counter starter circuit 4.

The first five pulse trains arriving at the input terminal 49 of the pulse-selector 3 when the system is started serve only to step up the pre-counter 69, and the first measuring pulse (see line a FIG. 2) appears at the output terminal 71 only when the sixth pulse train arrives. During the time which is gained by the delay for producing the first measuring pulse, the oscillating system of the clockwork can be stabilized if it got briefly out of step by a position change. The measuring accuracy of the system is thus increased.

A flip-flop 72 connected to the gate 65 and inverter 64 serves to reset the pre-counter 69 after the end signal generated by the timing member 35 has arrived at the terminal 66, or the start key (not shown) is actuated.

After the first measuring pulse has been received in the counter starter circuit 4, a confirmation of the reception is transmitted to the pulse selector 3 over line 12, which is connected to terminal 73. A bistable flip-flop 74 is set, which feeds a blocking signal over a line 75 and a gate 76 to the blocking input 51 of the monostable flip-flop 50. Accordingly no further pulses appear on line 56 to the feedback flip-flop 57 as long as the blocking signal is fed to the input 51 of the monostable flip-flop 59. Consequently no additional measuring pulses arrive at the output terminal 71 during this time.

As described above, the second measuring pulse should appear at the output terminal 71 only after four or 16 full oscillations (eight or 32 pulse trains) of the balance of the clockwork to be measured have occurred. As mentioned above, the pulse selector 3 receives at this time, over a terminal 77 which is connected to the line 13, the release signal generated by the movement counter 6 and represented on line h of FIG. 2, as soon as the reading of the movement counter 6 is less than 500. Terminal 77 is connected over a line 78 to another input of the gate 76. As soon as the release signal arrives at gate 76, the latter is blocked so that the blocking signal can no longer arrive at the blocking input 51 of the monostable flip-flop 50. Terminal 77 is also connected over line 78 to the NAND-gate 70 and the release signal has the effect of opening the NAND-gate 68. When the following pulse train arrives at the input terminal 49, the flip-flop 50 produces a pulse which arrives over line 56 to the feedback flip-flop 57, and over the inverters 59 and 67 and the now open NAND-gate 68 as a second measuring pulse at the output terminal 71. The bistable flip-flop 74 is reset over a line 79 simultaneously with the resetting of flip-flop 72 after the end signal has arrived at the terminal 66 from timing member 36 or by actuating the start key (not shown).

For measuring the poise of the balance, additional AND gates 80 and 81 are provided, each of which has one input connected over the terminals 82 and 83 respectively to the selector switch 14. When the selector switch 14 is set in a position for carrying out the measurement during four oscillations, a signal for opening the gate 80 is fed to terminal 82 and a signal for blocking the gate 81 is fed to terminal 83. The second input of the gate 80 is connected to a terminal 84, which is connected to a line 85 (FIG. 1) over which the pulse selector 3 receives a signal when the reading of the movement counter 6 is between 22,000 and 20,000, which occurs between the sixth and seventh pulse train. The signal appearing at the output of the gate 80 arrives, on the one hand, over a line 86 at an input of the gate 76 and, on the other hand, at a NAND-gate 87 so that a gate 88 is opened. The signal generated by gate 80 and fed to gate 76 has the effect that the latter is blocked, so that the blocking signal applied to the blocking input 51 of the monostable flip-flop is cut off. A following (seventh) pulse train arriving at the input terminal 49, which indicates the start of the fourth oscillation, has the effect that the flip-flop 50 is set. A bistable flip-flop 90 is set by the setting of the flip-flop 50 over a line 89 connected to the second output of the flip-flop 50 and gate 88, which is open at this time. The gate signal for the forward-backward counter is produced at terminal 94 (see line h of FIG. 2).

If the selector switch 14 is in the position for carrying out the measurement during 16 oscillations, the terminal 83 receives a signal for opening the gate 81, and the terminal 82 receives a signal for blocking the gate 80. The second input of gate 81 is connected to a terminal 91, which is connected to a line 92 (FIG. 1) over which a signal is fed to the pulse selector 3 when the reading of the movement counter 6 is between 8000 and 4000. The signal appearing at the output of the gate 81 arrives, on the one hand, over line 93 at the input of gate 76, and, on the other hand, at the NAND gate 87, so that the gate 88 is opened. The signal produced in gate 81 and fed to gate 76 has the effect that the latter is blocked, so that the blocking signal applied to the blocking input 51 of the monostable flip-flop 50 is cut off. A following pulse train, appearing at the input terminal 49, which indicates the start of the 16th oscillation, has the effect that the flip-flop 90 is set, as described above.

Due to the setting of the flip-flop 90, the release signal is generated which is fed over a terminal 94 and line 19 (FIG. 1) to the forward-and-backward counter 7, so that the latter begins to count the timing pulse fed to it over line 18. When the forward-and-backward counter 7, starting from zero, has reached a reading of more than 10,000, it feeds a signal over a line 95 to a terminal 96 of the pulse selector 3. This signal, which is represented on line f of FIG. 2, sets a flip-flop 96, which has the effect of producing a signal such that the gate 54 is opened. Since gate 54 is open, the following pulse train arriving at the input terminal 49 passes through the inverter 53 and the open gate 54 to provide a reversing pulse. This pulse, which is represented in line g of FIG. 2, is fed over line 20 connected to a terminal 98 to the forward-and-backward counter 7 to reverse the counting direction.

The appearance of the second measuring pulse produces in the counter starter 4 the control signal s1 which is fed over line 21 (FIG. 1) and a terminal 99 of the pulse selector 3 to the two flip-flops 90 and 97 to reset the latter. This has the effect that the release signal for the forward-backward counter 7 produced by the flip-flop 90, which is represented in line e of FIG. 2, is cut off so that the forward-and-backward counter 7 is stopped.

Forward-backward counter operates during the period of line e of FIG. 2, that is, one oscillation. The revising pulse on line g is produced at a predetermined count of counter 7, which corresponds to the half-way point of the period of line e. If the poise of the balance is correct, the forward count will be equal the backward count and the readout at indicator 29 will be zero.

It would naturally also be possible to effect the measurement of the poise of the balance during any other oscillation within the measuring interval instead of during the last oscillation. The measurement during the last oscillation has the advantage that the two counters 6 and 7 are stopped simultaneously so that the amount of time required for switching is reduced.

Figure 6:
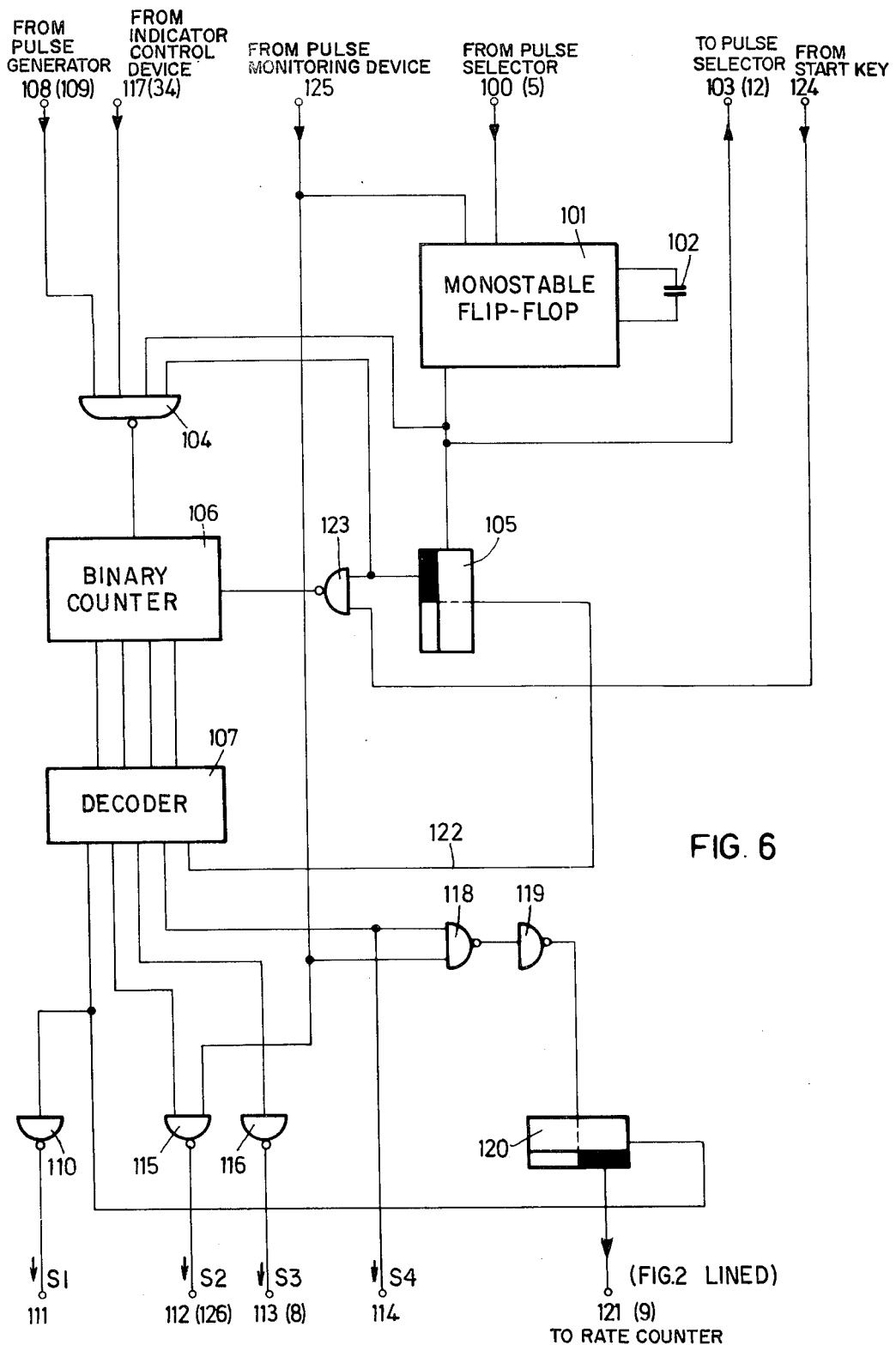
FIG. 6 is a detailed wiring diagram of the counter starting device according to FIG. 1.

Referring to FIGS. 1 and 6 the operation of the counter starter circuit 4 is now described. The first measuring pulse is fed over line 5 to the input terminal 100 of the counter starter 4 and to a monostable flip-flop 101, so that the latter changes its state. Flip-flop 101 generates a pulse whose length depends on the value of a capacitor 102. This pulse is returned over a terminal 103 and the line 12 to the terminal of the pulse selector 3 as confirmation of the reception of the first measuring pulse. This confirmation pulse is also fed to a gate 104 and to a bistable flip-flop 105.

An important function of the counter starter circuit 4 is to generate the control signals s3 and s4 in response to the appearance of the first measuring pulse at the input terminal 100 and the control signals s1 and s2 in response to the appearance of the second measuring pulse. In order not to impair the measuring accuracy, these control signals must be of much shorter duration than the measuring pulses. In order to obtain very short duration control signals, the counter starter circuit 4 has a binary ring counter 106 and a decoder 107. Decoder 107 changes binary code into decimal code. The binary ring counter 106 counts only from 1 to 9 and then starts again. The binary counter 106 receives a counting pulse at a rate of about 2.5 NHz through gate 105 from a terminal 108, which is connected over a line 109 (FIG. 1) to the pulse generator 10.

The control signals s1, s2, s3 and s4 appear at the terminals 111, 112, 113 and 114 respectively. The terminal 111 is connected through an inverter 110 to the first counting stage of the decoder 107 and the control signal s1 appears only as long as the ring counter 106 is in the position "1". Terminal 112 is connected through a gate 115 to the third counting stage, terminal 113 through an inverter 116 to the fifth counting stage and terminal 114 is connected directly to the seventh counting stage of the decoder 107. Each time the ring counter 106 reaches the respective counting stage, the corresponding control signal appears at these terminals.

Control signal s1 controls the stopping of the counters 6 and 7, control signal s2 effects the optical readout, control signal s3 sets the counters 6, 7 to their starting position, and control signal s4 starts the counter 6.

After each measurement, a stop signal, which is generated in the indicator control device 26 in a manner described below, is fed to a terminal 117 over a line 34.

This stop signal blocks the gate 104 when the binary counter 106 is in the next position after the production of the control signal s2, hence in position "4", in which no control pulses are generated anymore. Because the monostable flip-flop 101 is in rest position, the gate 104 is blocked, even if the stop signal has been cut off after the indication of the preceding measurement had been completed.

When the first measuring pulse arrives at the input terminal 100 of the counter circuit 4, the monostable flip-flop 101 flips to produce the confirmation pulse at terminal 103. This pulse also opens the gate 104 and sets the bistable flipflop 104. The binary counter 106 can now count the clock pulses and generates thus first the control signal s3, which is fed over the inverter 116, terminal 113 and line 8 to the movement counter 6 and to the forward-and-backward counter 7, setting the latter to its starting position. Immediately thereafter the control signal s4 appears at the terminal 114, which is also applied to a NAND-gate 118. S4, which is represented on line c of FIG. 2, also passes through an inverter 119 to a bistable flip-flop 120 so that the latter is set. When set, this flip-flop 120 produces the gate signal, which is represented on line d of FIG. 2, at terminal 121 which is supplied over line 9 to the movement counter 6. Counter 6 starts to count backward from its set reading.

The binary counter 106 continues to count up to its last counting stage. At this last count position, a reset signal is supplied by decoder 107 over a line 122 to the flip-flop 105, so that the latter is reset back to its original state, and a signal is also fed back to the binary counter 106 over a NAND-gate 123 so that the counter is set back to its starting position "0". At the same time the pulse from flip-flop 105 blocks the gate 104. The binary counter 106 remains in this state of not counting during the measuring interval.

When the second measuring pulse arrives at the input terminal 100 at the end of the measuring interval, the monostable flip-flop 101 again changes its state. The gate 104 is thus opened so that the binary counter 106 can start to generate the control signals s1 and s2. If the remaining result is good, below the predetermined error, the gate 104 is blocked by the above mentioned stop signal on line 34 at terminal 117 until a new first measuring pulse arrives at the input terminal 100.

But if it is found, in a manner to be described below, that the measuring result is insufficient above the predetermined error, the stop signal does not appear on line 34 and a new measuring interval is started. This occurs because the binary counter 106 continues to count unhindered and generates directly the control signals s3 and s4 so that the two counters 6 and 7 are set again and the movement counter 6 is started, using the second measuring pulse, which should end the first measuring interval, as the first measuring pulse for a new, the second, measuring interval.

By using the start key mentioned above (not shown) a pulse can be fed over a terminal 124 to the NAND-gate 123 so that, when the device is started, the binary counter 106 can be brought into a defined starting position.

According to a preferred embodiment, the system can have a pulse monitoring device, described below with reference to FIG. 8. When the latter finds that an interference pulse has arrived at its input, it generates an error pulse signal which is fed to a terminal 125 of the counter starter 4. This error pulse signal appears at the inputs of the monostable flip-flop 101, the gate 115 and the NAND-gate 118. In response to the error signal, the monostable flip-flop 101 produces a simulated measuring pulse. The gates 115 and 118 are also blocked in response to this signal so that the control signals s2 and s4 can not arrive in the indicator control device 26 and in the movement counter 6 respectively. Due to the simulation of a second measuring pulse, the binary counter 106 is set again to its starting position and starts a new measuring interval when the next correct measuring pulse arrives.

Figure 7:
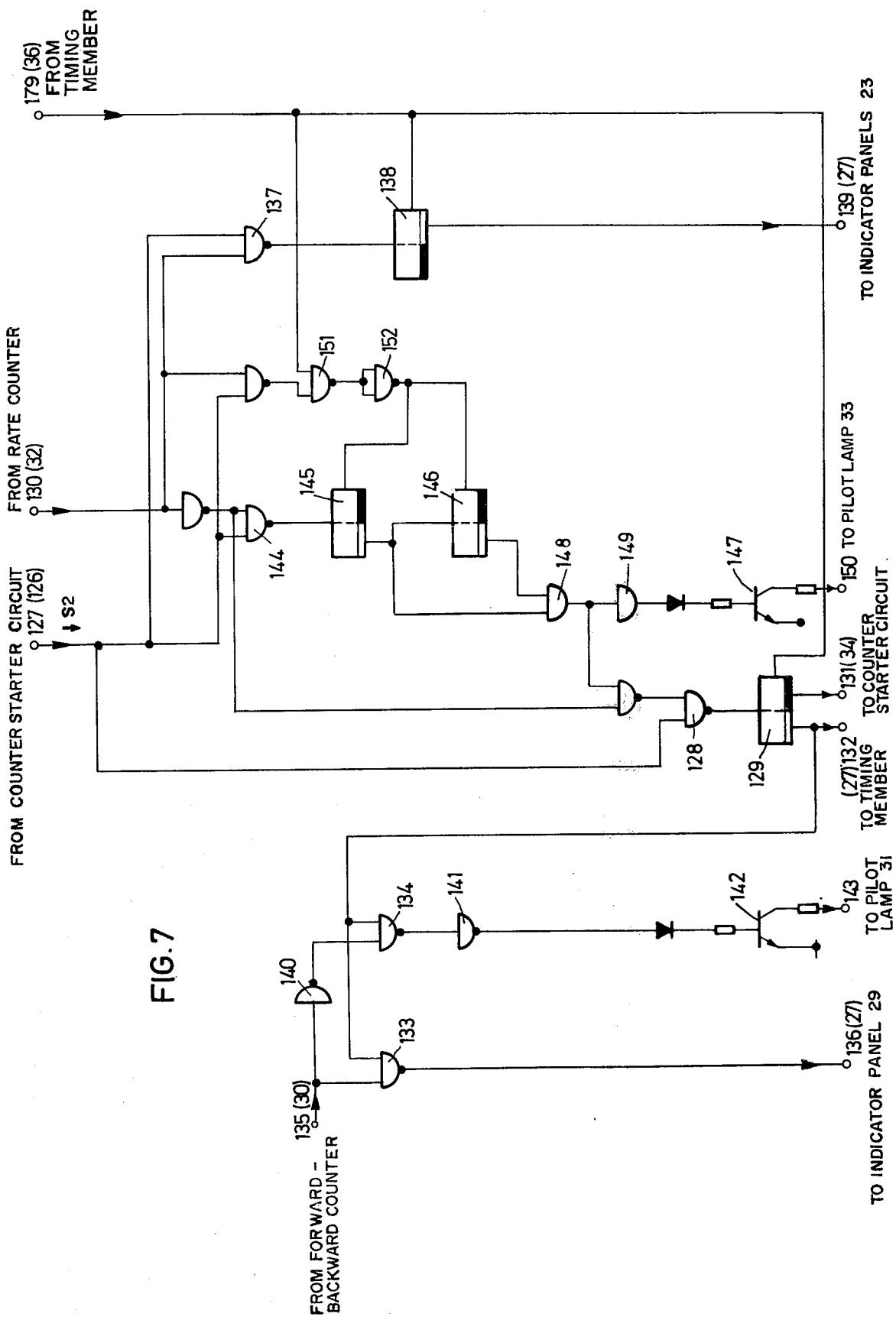
FIG. 7 is a detailed wiring diagram of the indicator control device according to FIG. 1.

FIG. 7 shows the details of the indicator control device 26, which is described more fully below with partial reference to FIG. 1. After the two counters 6 and 7 have been stopped by the signal, the indicator control device 26 receives from the counter starter circuit 4 over line 126 and terminal 127 the control signal s2, which is represented in line c of FIG. 2. Control signal s2 arrives at one input of a NAND-gate 128. The s2 signal appears at the input of a bistable flip-flop 129 when a signal also appears at a terminal 130, which is connected by line 32 to the movement counter 6, which indicates that the reading of the movement counter 6 is less than 500. The signal at terminal 130 opens the NAND-gate 128. The flip-flop 129 is set so that the stop signal appears at the terminal 131 at one output of the flipflop which is connected over line 34 to the counter starter circuit 4. In this case the stop signal must be so understood that a previously existing gate signal to the counter is cut off.

The second output of the flip-flop 129 is connected to a terminal 132, to which is connected the timing control member 35 (FIG. 1) over the first wire of the three-wire line 27. The second output of the flip-flop 129 is furthermore connected to one input of each of a pair of AND gates 133 and 134. Gate 133 is open and the gate 134 blocked if no signal appears at the terminal 135 which is connected over line 30 to the forward-and-backward counter 7. The absence of a signal at 135 means that the reading of the forward-and-backward counter is not more than 9. A signal appears on the second wire of the three-wire line 27 which signal readies the indicator panel 29 so that the latter lights up and the reading of the forward-and-backward counter 7 is visible.

The control signal s2 received at the terminal 127 is also fed to an AND gate 137, which is open if a signal also appears at the terminal 130, which indicates that the reading of the movement counter 6 is less than 500. The control signal s2 passes through gate 137 and arrives therefore at the set input of a bistable flip-flop 138. The latter is set so that a signal appears at a terminal 139, which is connected over the third wire of the three-wire line 27 to the three indicator panels 23 for indicating the count of the movement counter, which signal makes the indicator panels light up so that the reading of the movement counter 6 is visible.

If a signal is supplied to the terminal 135 from the forward-and-backward counter 7 when the count is greater than 9, it is applied directly to the gate 133 and through an inverter 140 to gate 134. This blocks AND gate 133 and AND gate 134 is open. The signal generated by the set flip-flop 129 therefore does not pass through gate 133 to arrive at the terminal 136. However, it passes through gate 134 and on inverter 141 to a switching transistor 142 which turns on the pilot lamp 31 connected over a terminal 143. Lighting of lamp 31 indicates that the measured value of the poise of the balance is outside the permissible tolerance.

When the control signal s2 arrives at the terminal 127 and no signal appears at the terminal 130, because the reading of the movement counter is greater than 500, the NAND-gate 128 and the gate 137 are blocked. Therefore, no stop signal is produced, but a new measuring interval is started automatically, as described above with reference to FIG. 6. The visual indication is also stopped.

The s2 control signal sets a bistable flip-flop 145 over a gate 144 when there is no signal at terminal 130. When a signal appears at the terminal 130 at the end of the second measuring interval and when the control signal s2 arrives at the terminal 127, the two flip-flops 129 and 138 are set as described above.

If the measurement again shows a reading of the movement counter 6 of more than 500 during the second measuring interval, no signal appears again at the terminal 130 when the control signal s2 arrives at the terminal 127. The two flipflops 129 and 138 can therefore not be set. Another flip-flop 146 is set instead. Since no stop signal is produced in this case, a third measuring interval is started automatically.

If only the control signal s2 appears at the terminal 127 at the end of this third measuring interval, the two flipflops 129 and 138 are set, which effects the indication of the measuring values. But if no signal appears at the terminal 130 at the end of the third measuring interval when the control signal s2 arrives, a signal is fed to another switching transistor 147 over a gate 148 and an inverter 149, so that the pilot lamp 33 connected to a terminal 150 lights up, indicating that the movement accuracy measured three times is outside the permissible tolerance. The three indicator panels 23 for the movement accuracy remain dark. But the indicator panel 25 lights up, so that it can at least be determined whether the tested clockwork is too fast or too slow.

When the timing member 35 transmits over line 36 the end signal to the pulse selector 3, this end signal is also fed to a terminal 179 of the indicator control device 26. Due to this end signal, the two flip flops 129 and 138 are reset back to their original states, so that the indication is ended. The end signal also arrives over a NAND-gate 151 and an inverter 152 to the reset inputs of the flip-flops 145 and 146, so that the latter are also set back to their original states.

In order to further increase the measuring accuracy of the system, a pulse monitoring device 180 can be used, as mentioned above and described more fully below with reference to FIG. 8. This pulse monitoring device is preferably located between the pulse selector 3 and the amplifier 2. The output of the amplifier 2 is connected to an input terminal 153 so that the pulse trains produced in the amplifier 2 arrive in a Schmitt trigger 154 whose output is connected through an AND gate 155 to an output terminal 156. This output terminal is connected to the input terminal 49 of the pulse selector 3. Before the pulse trains from the amplifier 2 arrive in the pulse selector 3, they are checked in the pulse monitoring device to determine whether or not they are suitable for the measurement.

Figure 9:
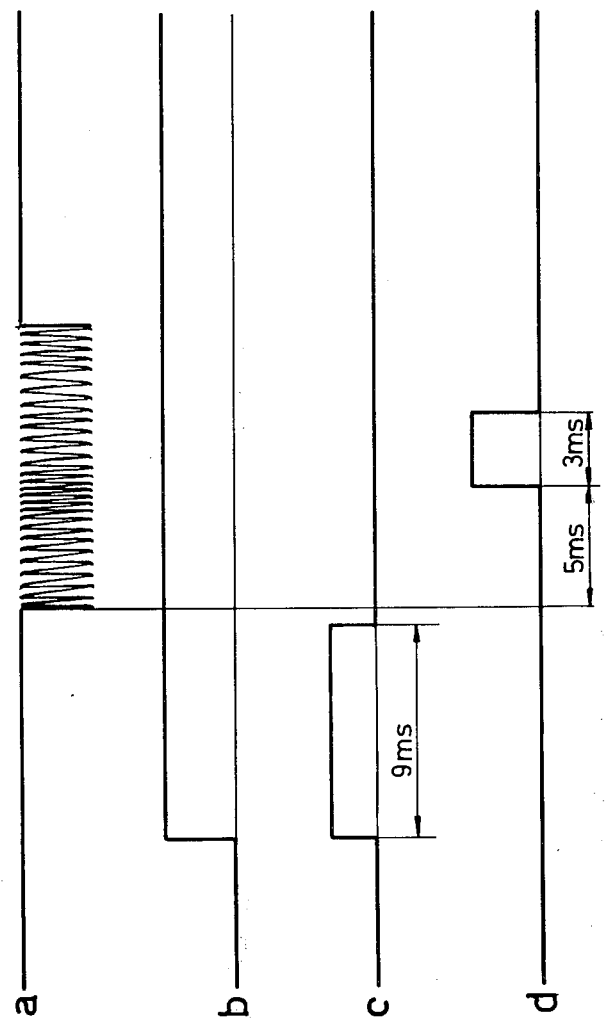
FIG. 9 shows graphic representations of the pulse to illustrate the operation of the pulse monitoring device according to FIG. 8.

At the end of a visual indication, the end signal is produced by the timing member 35 and is applied over line 36 to a terminal 157 of the pulse monitoring device 180. The end signal sets two 16-stage counters 160 and 161 to zero over a gate 158 and an inverter 159. To the first of these counters is fed pulses of a frequency of about 27 kHz over a terminal 162 from the pulse generator 10 over a line not shown here. Each time the first counter 160 reaches its highest count, it transmits a pulse to the second counter 161. As long as the second counter has not counted high enough to reach its 15th counting stage, a gate 163 connected to the various stages of counter 161 produces a closing control signal. This signal is represented in line c of FIG. 9. The closing control signal is applied to a gate 164 and to a bistable flip-flop 165, so that the gate 164 is opened and the flip-flop 165 remains in its original state. The AND gate 155 is closed for the time being.

When the second counter 161 has reached the 15th counting stage, the closing control signal disappears at the output of the gate 163. Gate 164 is now blocked and the flip-flop 165 is set. The AND gate 155 is now open so that pulse trains which arrive at the input terminal 153 can now be fed from Schmitt trigger 154 over the open gate 155 and the output terminal 156 to the pulse selector 3.

If a pulse train arrives at the input terminal 153 before the second counter 161 has reached its 15th counting stage, the pulse generated by the Schmitt trigger 154 arrives over the still open gate 164 to a bistable flip-flop 166 so that the latter is set. This has the result that a signal is fed to the flip-flop 165 through a gate 167 and an inverter 168 which holds flip-flop 165 in its original state so that it can not be set. The pulse produced by the Schmitt trigger 154 is also applied to the gate 155 but cannot arrive at the output terminal 156 since gate 155 is blocked. Furthermore an AND gate 169 is closed by the setting of the flip-flop 166, which has the effect that the counters 160 and 161 are again reset to their starting position over the gate 158 and the inverter 159 and begin to count again.

The above described arrangement prevents the measurement from being started accidentally in the middle of a pulse train. Only those pulse trains are transmitted to the pulse selector 3 which appear after the arrival of the closing control signal, that is when the counter 161 is counting above its 15th stage. The frequency of the pulses fed to the terminal 162 and the number of counting stages of the counters 160 and 161 are so selected that the closing control signal lasts about 9 ms.

In order to make sure that the pulse train arriving in the pulse selector 3 is a true pulse train, the pulse generated in the Schmitt trigger 154 is fed to a NAND-gate 170 whose second input is connected to the output of the second of two series-connected monostable flip-flops 171 and 172. The input of the first flip-flop 171 is connected to a terminal 173 which is connected to the line 12 on which a pulse is returned as confirmation of the reception from the counter starter circuit 4 to the pulse selector 3 when the first measuring pulse has arrived in the counter starter 4.

When the confirmation pulse arrives at the terminal 173, the first monostable flip-flop 171 flips and returns after 5 ms to its starting position, flipping the second series-connected monostable flip-flop 172. The latter produces a control pulse, represented in line d of FIG. 9, which is fed to the NAND-gate 170 and to a bistable flip-flop 174. The monostable flip-flop 172 returns after about 3 ms to its rest position.

If the pulse produced by the Schmitt trigger 154, which is fed to the first input of the NAND-gate 170, is still there when the second monostable flip-flop 172 produces the control pulse, a bistable flip-flop 175 is set. Setting of flip-flop 175 produces a signal which is applied to the flip-flop 174 over a gate 176 and in inverter 177 to hold flip-flop 174 in its original state so that the flip-flop 174 can not respond to the trailing edge of the control pulse from monostable flip-flop 172 to be set.

If the pulse generated by the Schmitt-trigger 154 is of short duration because the input terminal 153 has received only an interference pulse instead of a true pulse train, no pulse is fed to the first input of the NAND-gate 170 by the Schmitt trigger when the control pulse produced by the monostable flip-flop 172 arrives at the second input. In this case the flip-flop 175 is not set and the flip-flop 174 is no longer held in its original state so that the flip-flop 174 is set when the trailing edge of the control pulse appears from flip-flop 172. When set, the flip-flop 174 produces the error pulse signal, which is fed over a terminal 178 and a line (not shown) to the terminal 125 of the counter starter 4 and starts there a new measuring interval.

Figure 8:
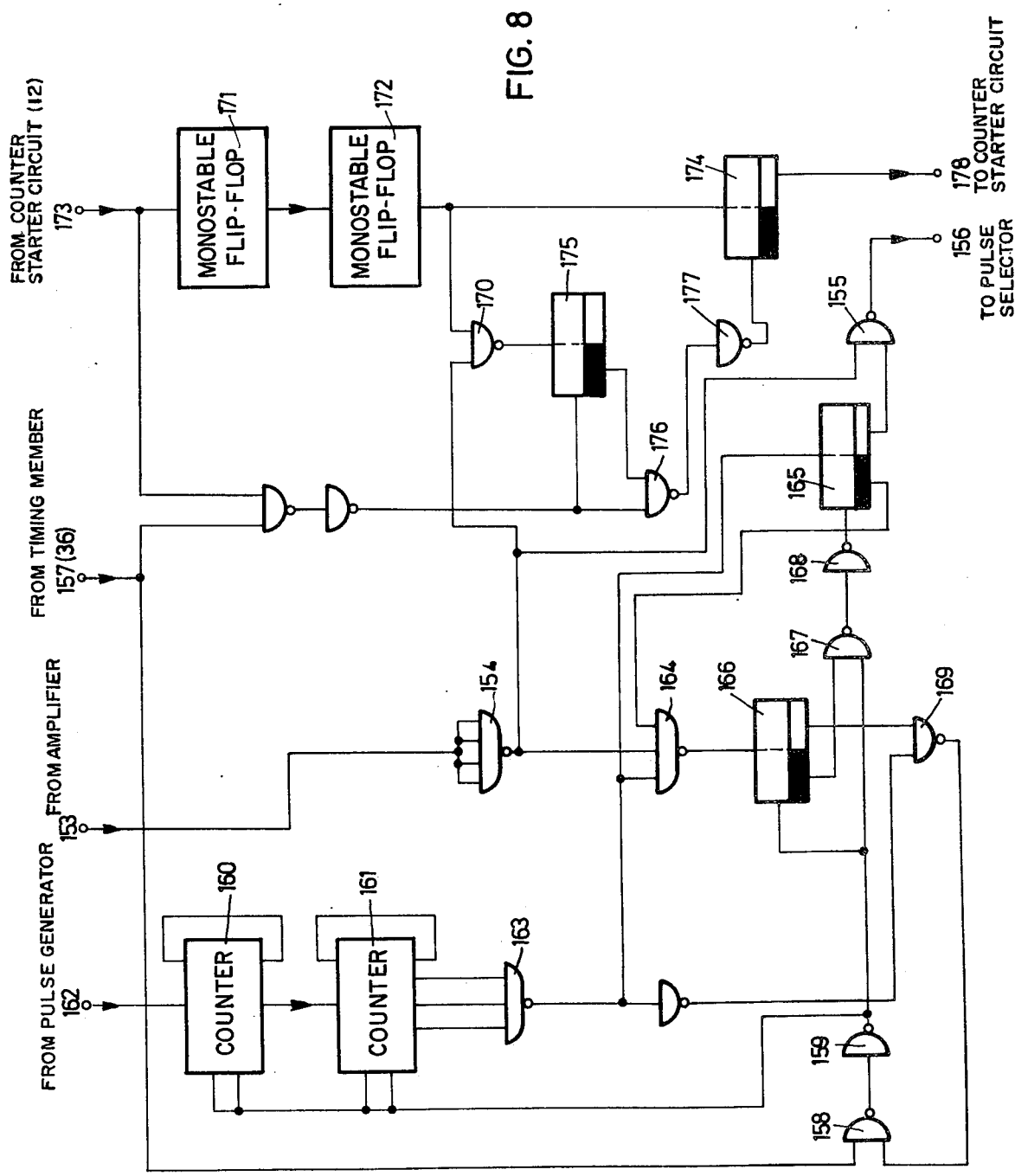
FIG. 8 is a detailed wiring diagram of a pulse monitoring device.

The pulse monitoring device 180 shown in FIG. 8 performs two functions. It allows the pulse train represented in line *h* of FIG. 9 to pass to the pulse selector 3 only when it appears at the earliest 3 ms after the appearance of the end signal in line *b* of FIG. 9, which indicates the end of the preceding measurement and at the same time the start of the following measurement. Furthermore the transmitted pulse trains are checked if they are sufficiently long by determining once or several times whether the pulse train still lasts. If it is found that the pulse train does not have the normal length, namely about 1/5 of an oscillation of the balance of the clockwork to be measured, the error pulse signal is produced, which has the effect that a new measuring interval is started.

The above described device permits the digital indication of the accuracy of the clockwork and of the poise of the balance. The device is equipped with means which practically make a wrong measurement impossible so that the indicated values are much more accurate than the values determined with the prior art devices.

What is claimed is:

1. Apparatus for the digital indication of the accuracy of a mechanical clockwork comprising means for producing electrical signals in response to the periodic sounds produced in the clockwork, pulse selector means connected to the output of said electrical signal producing means for producing a first measuring pulse at the beginning of a measuring interval extending over several oscillations of the balance of the clockwork and a second measuring pulse at the end of the measuring interval, pulse monitoring means coupled between said means for producing said electrical signals and said pulse selector means, gate means located between the input and the output of said pulse monitoring means, means for blocking said gate means until a predetermined time after the end of a measuring interval, means for producing timing signals, first counter means connected to said timing signal producing means and responsive to said first measuring pulse for starting a count at the beginning of said measuring interval and for terminating said count in response to the second measuring pulse, the count an said first counter means corresponding to the accuracy of the balance of the clockwork, forward and backward counter means for receiving said timing signals, means responsive to said electrical signals for staring said forward and backward counter means counting in one direction for a predetermined time of one oscillation cycle of the clockwork balance and in the reverse direction for the remainder of the oscillation cycle for measuring the poise of the balance of the clockwork, first indicator display means connected to said first counter means for displaying the count of said first counter means, second indicator display means connected to said forward and backward counter for displaying the count of said forward and backward counter means.

2. Apparatus according to claim 1 wherein said pulse monitoring means includes means for producing an error signal when the electrical signals supplied to the input of said pulse monitoring means are of less than a predetermined duration.

* * * * *